US012636961B2

(12) United States Patent
Wang et al.

(10) Patent No.: US 12,636,961 B2
(45) Date of Patent: May 26, 2026

(54) ELECTRIC-POWERED DEVICE AND INSTALLATION SEAT THEREOF

(71) Applicant: CONTEMPORARY AMPEREX TECHNOLOGY (HONG KONG) LIMITED, Hong Kong (CN)

(72) Inventors: Xia Wang, Ningde (CN); Ling Shuai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 308 days.

(21) Appl. No.: 18/236,947

(22) Filed: Aug. 23, 2023

(65) Prior Publication Data

US 2024/0001778 A1 Jan. 4, 2024

Related U.S. Application Data

(63) Continuation of application No. PCT/CN2022/070906, filed on Jan. 10, 2022.

(51) Int. Cl.
B60L 50/64 (2019.01)
H01M 50/249 (2021.01)

(52) U.S. Cl.
CPC ........... B60L 50/64 (2019.02); H01M 50/249 (2021.01)

(58) Field of Classification Search
CPC ... B60L 50/64; B60K 1/04; B60K 2001/0455; H01M 50/249
See application file for complete search history.

(56) References Cited

U.S. PATENT DOCUMENTS 9,308,966 B2 * 4/2016 Kosuge

FOREIGN PATENT DOCUMENTS

| | | | | |
|---|---|---|---|---|
| CN | 104369652 | A | 2/2015 | |
| CN | 208127258 | U | 11/2018 | |
| CN | 110920373 | A * | 3/2020 | .............. B60L 53/80 |
| CN | 211764880 | U | 10/2020 | |
| CN | 112158062 | A | 1/2021 | |
| CN | 112248875 | A | 1/2021 | |
| CN | 113085521 | A | 7/2021 | |
| CN | 115556559 | A * | 1/2023 | .............. B60L 50/66 |
| DE | 102012202164 | A1 * | 8/2013 | .............. B60L 53/80 |
| DE | 102012208047 | A1 * | 11/2013 | .............. B60K 1/04 |

(Continued)

OTHER PUBLICATIONS

Office Action issued Jul. 12, 2024 in Japanese Patent Application No. 2023-552280 with English translation thereof.

(Continued)

*Primary Examiner* — James A Shriver, II
*Assistant Examiner* — Nicholas R. Kandas
(74) *Attorney, Agent, or Firm* — XSENSUS LLP

(57) ABSTRACT

An installation seat may be adapted for installing a battery and include: a seat body, a support assembly and a locker. The support assembly may be disposed on the seat body and include a first support seat and a second support seat spaced apart from each other. The locker may be disposed on the seat body and include a locking shaft, the locking shaft may be adapted to extend through a portion of the battery protruding into a space between the first support seat and the second support seat and be supported on the first support seat and the second support seat to fix the battery.

20 Claims, 7 Drawing Sheets

(56)　　　　　　References Cited

FOREIGN PATENT DOCUMENTS

| | | | |
|---|---|---|---|
| DE | 102012219081 A1 * | 4/2014 |
| JP | S52-76010 U | 6/1977 |
| JP | S56-53921 A | 5/1981 |
| JP | H01-106747 A | 4/1989 |
| JP | 11208287 A * | 8/1999 |
| JP | H11-208287 A | 8/1999 |
| JP | 2010-125867 A | 6/2010 |
| JP | 2012-136077 A | 7/2012 |
| KR | 10-2016-0107601 A | 9/2016 |
| KR | 10-2017-0108487 A | 9/2017 |
| KR | 10-2021-0121306 A | 10/2021 |
| WO | 2020/091672 A1 | 5/2020 |

OTHER PUBLICATIONS

International Search Report mailed on Oct. 12, 2022, received for PCT Application PCT/CN2022/070906, filed on Jan. 10, 2022, 6 pages including English Translation.
Extended European Search Report issued Apr. 9, 2024 in European Patent Application No. 22917889.2.
Office Action issued Aug. 11, 2025 in Korean Patent Application No. 10-2023-7028844 with English translation thereof.

* cited by examiner

ELECTRIC-POWERED DEVICE AND INSTALLATION SEAT THEREOF

CROSS-REFERENCE TO RELATED APPLICATION

The present application is a continuation of International Application No. PCT/CN2022/070906, filed Jan. 10, 2022, which is incorporated herein by reference in its entirety.

TECHNICAL FIELD

The present application relates to the field of battery technologies, and particularly to an electric-powered device and installation seat thereof.

BACKGROUND

Batteries are widely used in electronic devices, such as mobile phones, laptops, battery cars, electric cars, electric aircraft, electric boats, electric toy cars, electric toy boats, electric toy planes and electric tools. The battery includes multiple battery cells, and the battery cells include cadmium nickel battery cells, hydrogen nickel battery cells, lithium-ion battery cells, and secondary alkaline zinc manganese battery cells.

The battery generally is installed on an installation seat of an electric-powered device. During operation of the electric-powered device, the battery will apply various impact loads on the installation seat, which will affect the service life of the installation seat. Therefore, how to improve the service life of the installation seat of the electric-powered device is an issue continuously researched by the technical personnel in the field.

SUMMARY

In view of above, the present application provides an electric-powered device and an installation seat thereof, which can improve the service life of the installation seat.

On one aspect, the embodiments of the present disclosure provide an installation seat of an electric-powered device, the installation seat being adapted for installing a battery and including: a seat body; a support assembly, disposed on the seat body and including a first support seat and a second support seat spaced apart from each other; and a locking mechanism or locker, disposed on the seat body and including a locking shaft, wherein the locking shaft is adapted to extend through a portion of the battery protruding into a space between the first support seat and the second support seat and be supported on the first support seat and the second support seat to fix the battery.

In the installation seat provided in the embodiments of the present application, the support assembly including the first support seat and the second support seat is provided and the first and second support seats support the locking shaft together, and the supporting position of the locking shaft for the battery is arranged between the first support seat and the second support seat. As such, under the same loads such as impacts and vibrations, the bending moment borne by the locking shaft is relatively small, the bearing capacity of the locking shaft is improved and thus the service life of the installation seat is improved.

In some embodiments, the first support seat comprises a first support hole through which the locking shaft extends; and/or, the second support seat comprises a second support hole through which the locking shaft extends. As such, the first support seat and/or the second support seat can bear loads in various directions applied by the locking shaft, and the bearing capacity of the installation seat can be further improved.

In some embodiments, the locking shaft includes an inclined segment inclining toward a direction close to the battery along a protruding direction of the locking shaft; the inclined segment is adapted to match with a wedge of the battery. As such, a good fit between the battery and the locking shaft can be ensured, thereby reducing the processing accuracy requirements at the fitting position between the locking shaft and the battery, and thus reducing production costs.

In some embodiments, the inclined segment includes a first sub segment and a second sub segment, and the first and second sub segments are distributed in a stepped manner. As such, the installation difficulty of the battery can be reduced.

In some embodiments, the locking mechanism further includes a driving component or driver connected to the locking shaft, and the driving component is adapted to drive the locking shaft to move. By providing the driving component to drive the locking shaft to move, the movement of the locking shaft can be more labor-saving and convenient.

In some embodiments, the locking mechanism further includes a sleeve, the sleeve is sleeved on the locking shaft, and the locking shaft is able to protrude out of the sleeve. The sleeve can reduce the risk of external particles, dust, or the like infiltrating into the extension-retraction joint of the locking shaft and thus causing the locking shaft to become stuck. Moreover, during the movement of the locking shaft, the sleeve can provide guiding for the movement of the locking shaft, thereby reducing the risk of deviation of the locking shaft.

In some embodiments, the first support seat is connected to the sleeve, and the second support seat is connected to the first support seat. The integrity of internal structure of the installation seat is improved, thereby improving the movement accuracy of the locking shaft and the fitting accuracy of the locking shaft and the battery.

In some embodiments, the installation seat includes a plurality of locking mechanisms, and the plurality of locking mechanisms are spaced apart on the seat body. As such, the loads borne by one single locking mechanism is reduced, and the bearing capacity of the installation seat is improved.

In some embodiments, the battery is supported on the installation seat along a first direction, the battery includes first surfaces arranged opposite in a second direction and second surfaces arranged opposite in a third direction, the first surfaces are connected to two second surfaces, and any two of the first direction, the second direction, and the third direction are perpendicular to each other; and the installation seat includes two locking mechanisms, the two locking mechanisms are spaced apart in the second direction, two locking shafts are arranged with their axial directions in the second direction, and the two locking shafts protrude in opposite directions; or, the installation seat includes a plurality of pairs of locking mechanisms, the locking mechanisms in each pair are spaced apart in the second direction, and the plurality of pairs of locking mechanisms are spaced apart in the third direction, wherein the locking shafts are arranged with their axial directions in the second direction, and the locking shafts in each pair of locking mechanisms protrude in opposite directions. The force applied on the locking shaft of each locking mechanism is further reduced, and it is conductive to improving the force balance of the battery and the installation stability of the battery after it is installed on the installation seat.

In some embodiments, the installation seat further includes a guiding-positioning mechanism or structure disposed on the seat body, and the guiding-positioning mechanism is adapted to guide the battery to move and position the battery. As such, the installation accuracy and efficiency of the battery can be effectively improved.

In some embodiments, the guiding-positioning mechanism includes: a guiding member, including a guiding surface adapted to guide a movement of the battery; and a positioning pin, adapted to match with a positioning hole of the battery to position the battery. The guiding and positioning function of the guiding-positioning mechanism is ensured, and meanwhile the structure of the guiding-positioning mechanism is simplified.

On a second aspect, the embodiments of the present application further provide an electric-powered device, including the installation seat according to any of the above embodiments; and a battery, wherein a portion of the battery protrudes into a space between the first and second support seats, the locking shaft extends through the portion of the battery that protrudes into the space between the first and second support seats and is supported on the first and second support seats so as to fix the battery.

The electric-powered device provided in the embodiments of the present application produces the same technical effects as-mentioned above by using the installation seat provided in any of the above embodiments, and the detail will not be repeated here.

BRIEF DESCRIPTION OF THE DRAWINGS

In order to describe the technical solution of the embodiments of the present application more clearly, the accompanying drawings required in the embodiments of the present application are introduced briefly below. Obviously, the accompanying drawings described below are only part of the embodiments of the present application, and for ordinary skilled person in the art, other accompanying drawings can be obtained based on the accompanying drawings without any creative effort.

Figure 1:
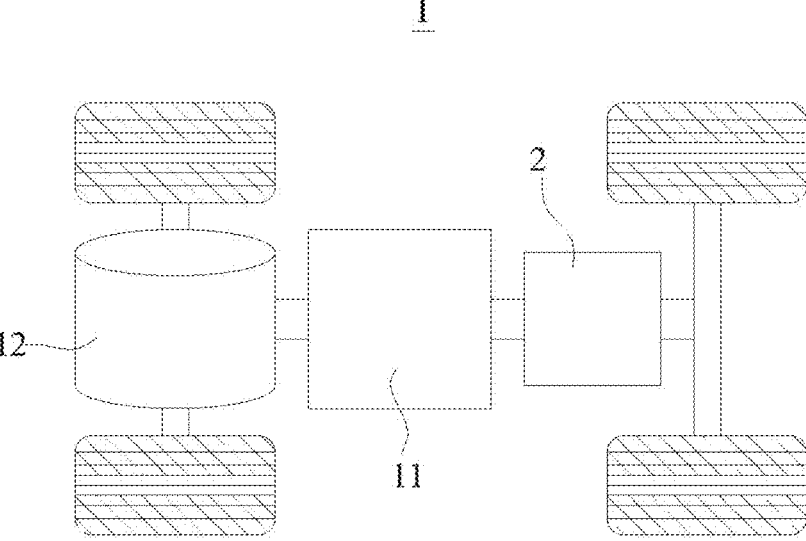
FIG. 1 is a structural schematic diagram of a vehicle provided in the embodiments of the present application.

The accompanying drawings are not drawn to the actual scale.

DESCRIPTION OF REFERENCE NUMERALS 1, vehicle; 11, controller; 12, motor.
2, battery; 21, casing; 211, first part; 212, second part; 21a, accommodating chamber; 22, locking member; 221, wedge.
3, battery module; 31, battery cell.
4, installation seat; 41, seat body; 42, support assembly; 421, first support seat; 421a, first support hole; 422, second support seat; 422a, second support hole; 43, locking mechanism; 431, locking shaft; 4311, inclined segment; 431a, first sub segment; 431b, second sub segment; 432, driving component; 433, sleeve; 44, guiding-positioning mechanism; 441, guiding member; 441a, guiding surface; 442, positioning pin.
X, first direction; Y, second direction; Z, third direction.

DETAILED DESCRIPTION

In order to make the purpose, technical solutions and advantages of the embodiments of the present application clearer, the technical solutions in the embodiments of the present application will be clearly described below in combination with the accompanying drawings in the embodiments of the present application. Obviously, the described embodiments are a part of the embodiments of the present application, not all of them. Based on the embodiments in the present application, all other embodiments obtained by ordinary skilled person in the art without creative labor fall within the protection scope of the present application.

Unless otherwise defined, all technical and scientific terms used in the present application have the same meanings as those commonly understood by the person skilled in the art of the present application; the terms used in the specification of the present application are only intended to describe specific embodiments while not limit the present application; the terms "include" and "have" in the description, claims and the above description of accompanying drawings of the present application, and any variations thereof, are intended to cover non-exclusive inclusion. The terms "first", "second", etc. in the description, claims and the above description of accompanying drawings of the present application are used to distinguish different objects, rather than to describe specific sequences or primary and secondary relationships.

When referring to "embodiment" in the present application, it means that specific features, structures, or characteristics described in combination with said embodiment can be included in at least one embodiment of the present application. The phrase appearing in various positions in the description does not necessarily refer to the same embodiment, nor is it an independent or alternative embodiment that is mutually exclusive with other embodiments.

In the description of the present application, it should be noted that unless otherwise specified and limited, the terms "installation", "connection". "coupling", and "attachment" should be broadly understood, for example, they can be fixed connections, detachable connections, or integrated connections; they can be direct connections, or indirect connections through intermediate mediums, or can be internal connections between two components. For ordinary skilled person in the art, the specific meanings of the above terms in the present application can be understood according to specific circumstances.

In the present application, the term "and/or" is only a description of association relationship of associated objects, indicating that there can be three types of relationships, for example, C and/or D can indicate the presence of C alone, the presence of C and D simultaneously, and the presence of D alone. In addition, the character "/" in the present application generally indicates that the associated objects before and after the character are in an "or" relationship.

In the embodiments of the present application, the same reference numerals represent the same components, and for simplicity, detailed descriptions of the same components are omitted in different embodiments. It should be understood that the thickness, length, width, and other dimensions of various components as well as the overall thickness, length, width, and other dimensions of the integrated device in the embodiments of the present application shown in the accompanying drawings, are only illustrative examples and should not constitute any limitations in the present application.

The term "a plurality of" in the present application refers to two or more (including two).

In the present application, a battery cell may include a lithium ion secondary battery cell, a lithium ion primary battery cell, a lithium sulfur battery cell, a sodium-lithium ion battery cell, a sodium ion battery cell, a magnesium ion battery cell, or the like, and the embodiments of the present application do not limit this. The battery cell can be in a shape of a cylinder, a flat body, a rectangular cuboid or in other shapes, and the embodiments of the present application do not limit this. The battery cells generally may be divided into three types according to packaging manners: cylindrical battery cells, square cells, and soft pack cells, and the embodiments of the present application do not limit this.

The battery mentioned in the embodiments of the present application refers to a single physical module that includes one or more battery cells to provide higher voltage and capacity. For example, the battery mentioned in the present application may include battery modules, battery packs, or the like. The battery generally includes a casing for packaging one or more battery cells. The casing can prevent liquids or other foreign substances from affecting charging or discharging of the battery cells.

When applied to an electric-powered device, the battery generally is installed on an installation seat of the electric-powered device, the installation seat is adapted to support the battery and achieve electrical connections between the battery and relevant functional modules in the electric-powered device.

The inventor found that damage of a supporting structure of the installation seat for the battery may occur in a high probability after the battery is installed on the installation seat of the electric-powered device, and then conducted a systematic analysis and research on the structure of the installation seat of the electric-powered device and the assembly manner between the installation seat and the electric-powered device. The results show that after the battery is installed on the installation seat, the installation seat supports the battery in a cantilever manner, during use of the electric-powered device, loads such as impacts, vibrations received by the battery are transmitted to the installation seat, and since the installation seat supports the battery in the cantilever manner, it bears a large bending load; as a result, the bearing capacity of the installation seat is greatly reduced, and under frequent loads such as impacts and vibrations, the support failure and even damage of the installation seat may easily occur, which seriously affects the service life of the installation seat and leads to the risk of detachment of the battery from the installation seat.

Based on the above issues found by the inventor, the inventor has improved the structure of the installation seat, and the technical solutions described in the embodiments of the present application are applicable to the installation seat and the electric-powered device using the installation seat.

The electric-powered device may be a vehicle, a mobile phone, a portable device, a laptop, a ship, a spacecraft, an electric toy, an electric tool, and so on. The vehicle may be a fuel powered vehicle, a gas powered vehicle, or a new energy vehicle, and the new energy vehicle may be a pure electric vehicle, a hybrid electric vehicle, an extended range vehicle, or the like; the spacecraft includes an airplane, a rocket, a space shuttle, a space ship, and the like; the electric toy includes a fixed or mobile electric toy, such as a game machine, an electric car toy, an electric ship toy, an electric plane toy, and the like; the electric tool includes a metal cutting electric tool, a grinding electric tool, an assembly electric tool and a railway electric tool, such as an electric drill, an electric grinder, an electric wrench, an electric screwdriver, an electric hammer, an electric impact drill, a concrete vibrator, and an electric planer. The embodiments of the present application do not have special limitations on the above-mentioned electric-powered device.

For the convenience of description, the following embodiments are described by taking the vehicle as an example of the electric-powered device.

FIG. 1 is a structural schematic diagram of a vehicle 1 provided in some embodiments of the present application. As shown in FIG. 1, the vehicle 1 is provided with a battery 2 in its interior.

The battery 2 may be disposed at a bottom, head, or rear of the vehicle 1. The battery 2 may be adapted for supplying electrical power to the vehicle 1, and for example, the battery 2 may serve as an operating power supply of the vehicle 1.

The vehicle 1 may further include a controller 11 and a motor 12, the controller 11 is adapted for controlling the battery 2 to supply electrical power to the motor 12, for example, for meeting the electrical power requirements for starting, navigation, and travelling of the vehicle 1.

In some embodiments of the present application, the battery 2 may not only serve as the operating power source of the vehicle 1, but also serve as a driving power source of the vehicle 1, replacing or partially replacing fuel or natural gas to provide driving power for the vehicle 1.

Figure 2:
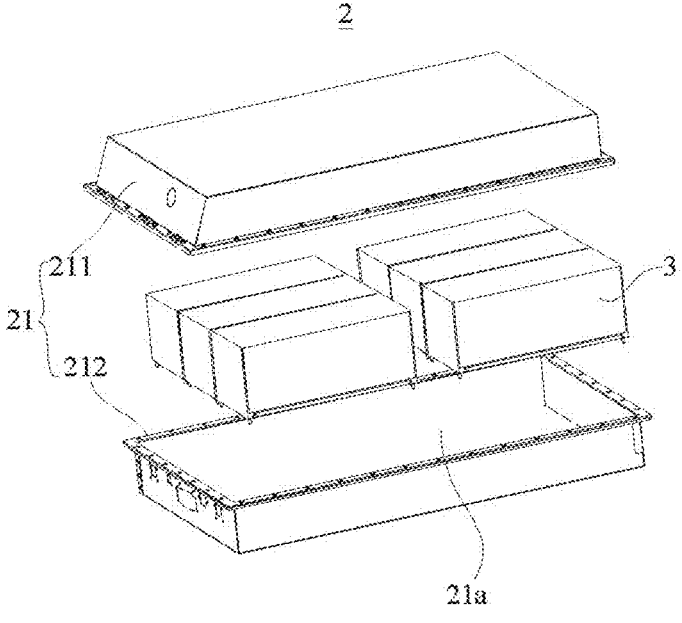
FIG. 2 is an explosive schematic diagram of a battery in an electric-powered device provided in the embodiments of the present application.

FIG. 2 is an explosive schematic diagram of the battery 2 provided in some embodiments of the present application. As shown in FIG. 2, the battery 2 includes a casing 21 and battery cells (not shown), which are accommodated within the casing 21.

The casing 21 is adapted to accommodate the battery cells, and may be formed into various structures. In some embodiments, the casing 21 may include a first part 211 and a second part 212, and the first part 211 and the second part 212 cover and close each other, and define an accommodating chamber 21a together for accommodating battery modules 3. The first part 211 can be a hollow structure with an opening at one end, the second part 212 is a plate-like structure, and the second part 212 covers and closes the opening side of the first part 211 to form the casing 21 with the accommodating chamber 21*a*; further, both of the first part 211 and the second part 212 may be formed as hollow structures each with an opening on one side, and the opening side of the first part 211 is covered and closed by the opening side of the second part 212 to form the casing 21 with the accommodating chamber 21*a*. Certainly, the first part 211 and the second part 212 can be formed in various shapes, such as cylinders, rectangular cuboids, and the like.

When the first part 211 covers and closes a top of the second part 212, the first part 211 can further be referred to as an upper casing cover, and the second part 212 can further be referred to as a lower casing body.

In the battery 2, there may be one battery cell or a plurality of battery cells. If there are a plurality of battery cells, the plurality of battery cells can be connected in series, in parallel, or in hybrid, where "in hybrid" means that the plurality of battery cells are connected both in series and in parallel. The plurality of battery cells can be directly connected in series, in parallel, or in hybrid together, and an integrity constituted by the plurality of battery cells can be accommodated in the casing 21; certainly, plurality of battery cells can further be connected in series, in parallel, or in hybrid to form battery modules 3, and a plurality of battery modules 3 can then be connected in series, in parallel, or in hybrid to form an integrity and accommodated in the casing 21.

Figure 3:
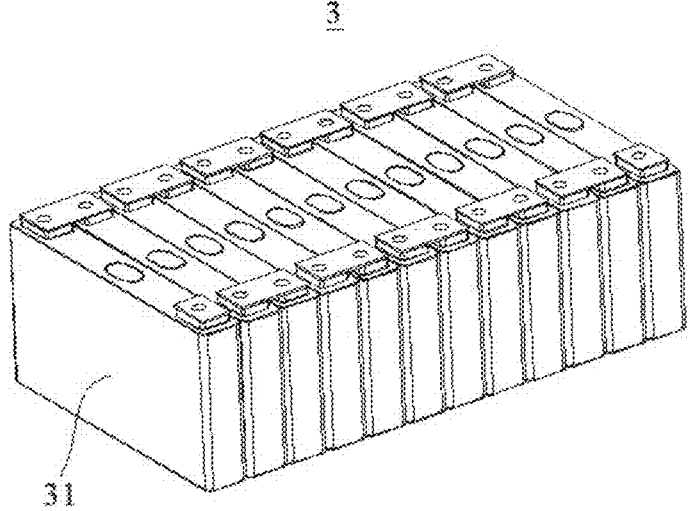
FIG. 3 is a structural schematic diagram of a battery module of a battery in an electric-powered device provided in the embodiments of the present application.

FIG. 3 is a structural schematic diagram of the battery module 3 shown in FIG. 2.

In some embodiments, as shown in FIG. 3, there are a plurality of battery cells 31, which are at first connected in series, in parallel, or in hybrid to form the battery module 3. A plurality of battery modules 3 are then connected in series, in parallel, or in hybrid to form an integrity and accommodated in the casing.

The plurality of battery cells 31 in the battery module 3 can be electrically connected through a busbar, so as to achieve connections of the plurality of battery cells 31 in the battery module 3 in parallel, in series, or in hybrid.

Figure 4:
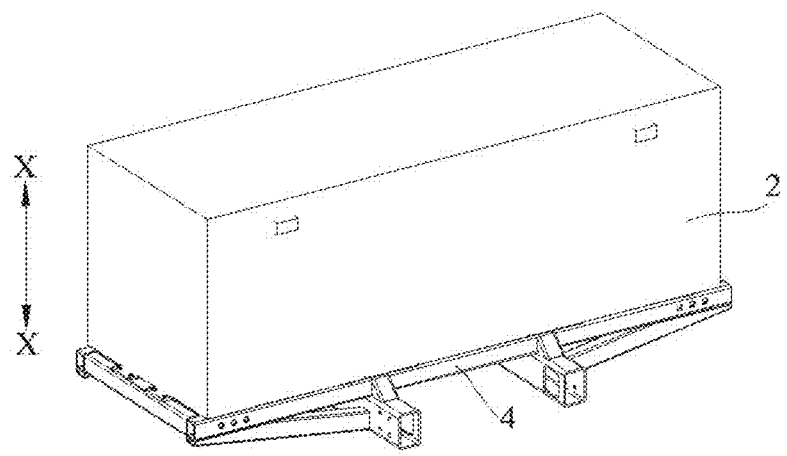
FIG. 4 is a structural schematic diagram of an installation seat and a battery in an installed state provided in the embodiments of the present application.
Figure 5:
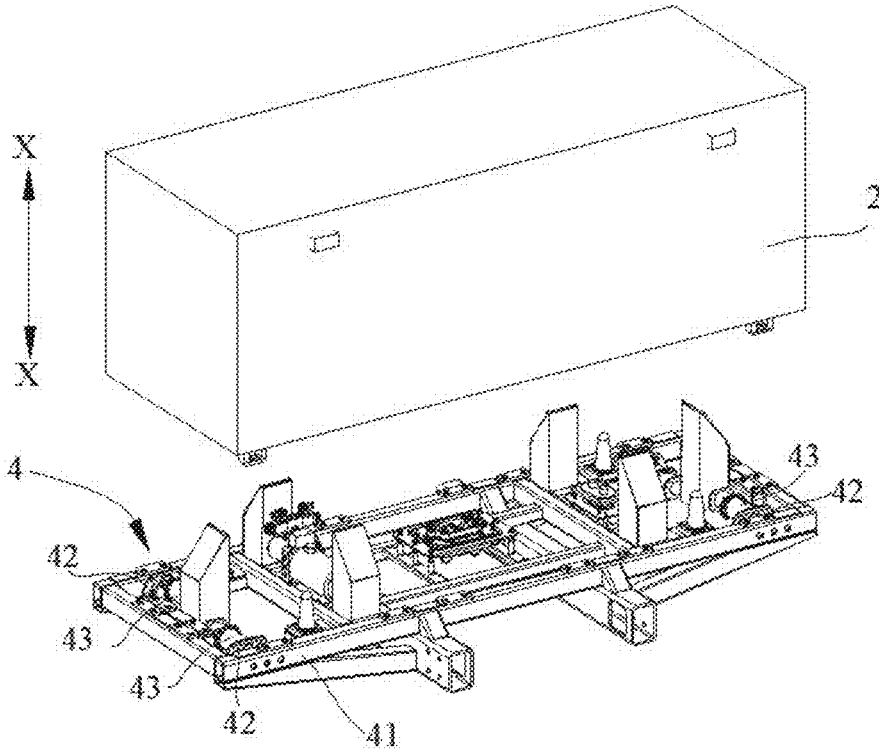
FIG. 5 is a structural schematic diagram of an installation seat and a battery in a state to be installed provided in the embodiments of the present application.
Figure 6:
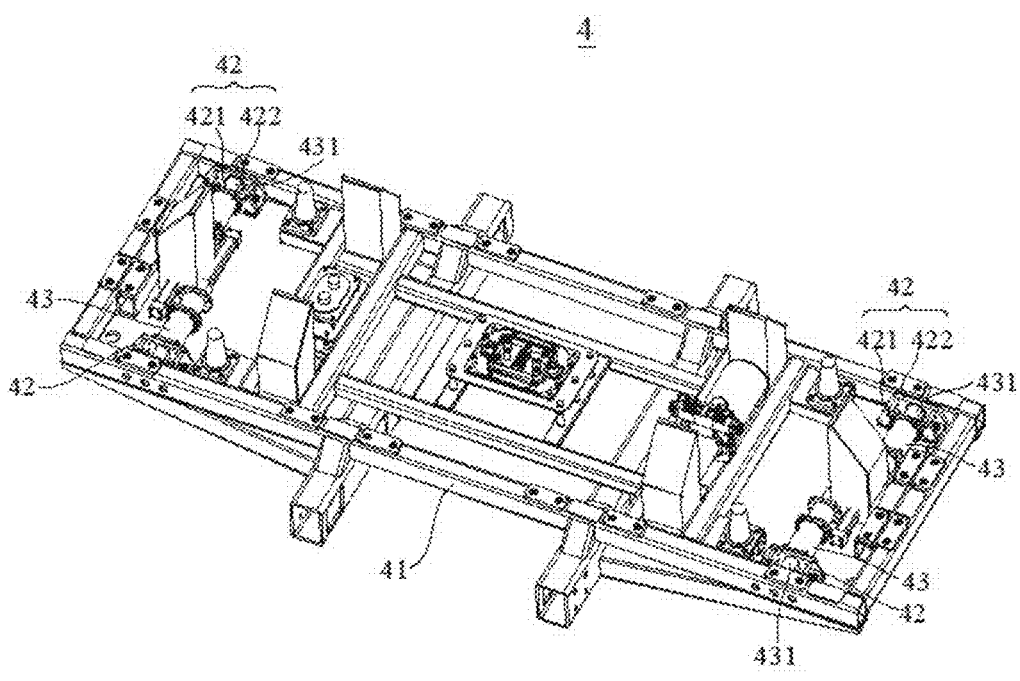
FIG. 6 is a structural schematic diagram of an installation seat provided in the embodiments of the present application.

As shown in FIGS. 4 to 6, the installation seat 4 of the electric-powered device provided according to the embodiments of the present application is adapted for installing the battery 2. The installation seat 4 includes a seat body 41, a support assembly 42, and a locking mechanism 43. The support assembly 42 is disposed on the seat body 41, and includes a first support seat 421 and a second support seat 422 that are spaced apart from each other. The locking mechanism 43 is disposed on the seat body 41 and includes a locking shaft 431, the locking shaft 431 is adapted for extending through a part of the battery 2 protruding into a space between the first support seat 421 and the second support seat 422, and is supported on the first support seat 421 and the second support seat 422 to fix the battery 2.

Specifically, the installation seat 4 is installed on the electric-powered device for carrying and limiting the battery 2. Further, the installation seat 4 may be integrated with other functional modules so as to achieve electrical connections between the battery 2 and related functional modules, thereby enabling the battery 2 to provide electrical power to the electric-powered device normally. The specific structure of the installation seat 4 is not limited, as long as it can be adapted for installing the battery 2. Taking the vehicle as an example of the electric-powered device, the installation seat 4 can be fixed on a chassis of the vehicle.

The seat body 41 can be a structure connected with the electric-powered device and integrated with the functional modules such as control components, it can be formed in a plate-like structure or assembled from rod-like structures, which can be selected according to specific application requirements.

After installing the battery 2 on the installation seat 4, the battery 2 is directly supported on the locking shaft 431 of the locking mechanism 43, the locking shaft 431 is supported between the first support seat 421 and the second support seat 422 of the support assembly 42, and a supporting part of the locking shaft 431 for the battery 2 is located between the first support seat 421 and the second support seat 422. As such, the locking shaft 431 is effectively supported on two sides of its supporting point for the battery 2, that is, the locking shaft 431 is supported at two points. Compared to the locking shaft 431 being supported in the cantilever manner (that is, the locking shaft 431 is effectively supported on merely one side of the supporting part for the battery 2 while the other side is suspended), the technical solution of being supported at two points can make the locking shaft 431 to bear a smaller bending load under the same loads such as impacts and vibrations, since the support assembly 42 supports the locking shaft 431 at two points.

The first support seat 421 and the second support seat 422 each have supporting surfaces, and specifically, the supporting surfaces are surfaces that fit with the locking shaft 431, and may be flat surfaces, curved surfaces or cylindrical surfaces, which can be selected according to actual requirements. The first support seat 421 and the second support seat 422 can be independently disposed on the seat body 41, or can be connected into an integrity and then disposed on the seat body 41.

Regarding the manner in which the locking shaft 431 extending through the battery 2, it is available that the locking shaft 431 extends through a closed structure of the battery 2, for example, through a closed cylindrical surface of the battery 2, or it is available that the locking shaft 431 extends through a semi closed structure of the battery 2, for example, through a semi closed semi-cylindrical surface of the battery 2, and the specific manner can be selected according to actual requirements.

Optionally, the battery 2 can be provided with a locking member 22 on its side closing to the installation seat 4, and the locking shaft 431 can be provided to extend through the locking member 22 of the battery 2.

The locking shaft 431 may support the battery 2 in a manner of line contact or surface contact. The supporting position of the locking shaft 431 for the battery 2 has a same distance or different distances from the first support seat 421 and the second support seat 422. It can be understood that when the supporting position of the locking shaft 431 for the battery 2 is located at a middle between the first support seat 421 and the second support seat 422, the locking shaft 431 has relatively close bending moments on two sides, and thus bears the smallest bending load under the same external load.

In the installation seat 4 provided by the embodiments of the present application, the support assembly 42 is provided to include the first support seat 421 and the second support seat 422, which support the locking shaft 431 together, and the supporting position of the locking shaft 431 for the battery 2 is arranged between the first support seat 421 and the second support seat 422. As such, under the same loads such as impacts and vibrations, the locking shaft 431 bears a relatively small bending moment, and thus the bearing capacity of the locking shaft 431 is improved and further the service life of the installation seat 4 is extended.

The first support seat 421 and the second support seat 422 may support the locking shaft 431 in the surface contact, line contact, or the like, and exemplarily, a portion of the locking shaft 431 contacting with the first support seat 421 or the second support seat 422 may be cylindrical, and the corresponding portion of the first support seat 421 or the second support seat 422 may be formed as a flat surface, a semi closed semi-cylindrical surface that matches with the locking shaft 431, or a closed cylindrical surface that matches with the locking shaft 431. There is no limitation here, and selections can be made according to actual requirements.

Figure 7:
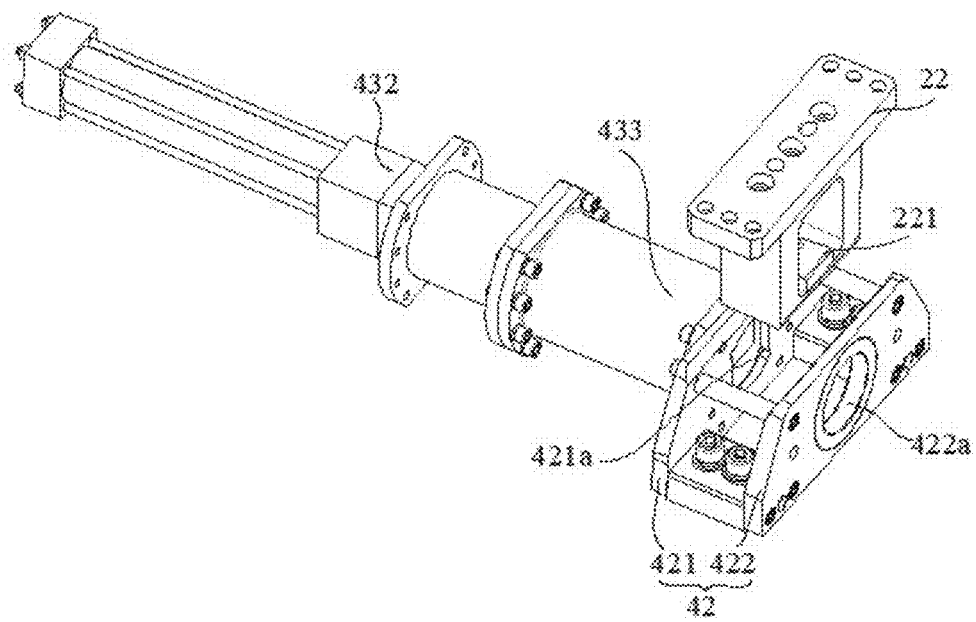
FIG. 7 is a structural schematic diagram of a support assembly and a locking mechanism in an installation seat and a locking member of a battery provided in the embodiments of the present application.

In some optional embodiments, as shown in FIG. 7, the first support seat 421 includes a first support hole 421*a*, through which the locking shaft 431 extends.

It can be understood that during operation of the electric-powered device, the loads of impacts and vibrations applied on the battery 2 may have various directions, and thus the loads applied on the locking shaft 431 by the battery 2 and the loads applied on the first support seat 421 by the locking shaft 431 may also have various directions. By providing the first support seat 421 with the first support hole 421*a*, the first support seat 421 can bear the loads in various directions applied on the first support seat 421 by the locking shaft 431, which can further improve the bearing capacity of the installation seat 4.

In some embodiments, further referring to FIG. 7, the second support seat 422 includes a second support hole 422*a* through which the locking shaft 431 extends.

Similarly to providing the first support hole 421*a* on the first support seat 421, by providing the second support seat 422 with the second support hole 422*a*, the second support seat 422 can bear loads in various directions, thereby improving the bearing capacity of the installation seat 4.

Figure 8:
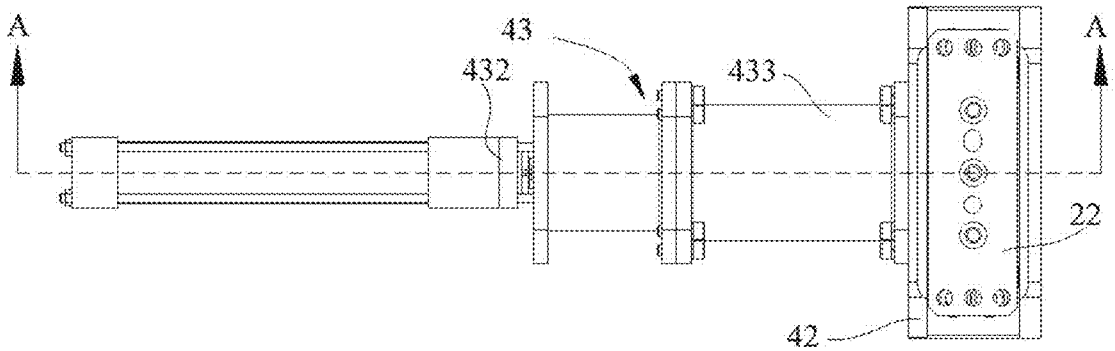
FIG. 8 is a top view of a support assembly and a locking mechanism in an installation seat and a locking member of a battery provided in the embodiments of the present application.
Figure 9:
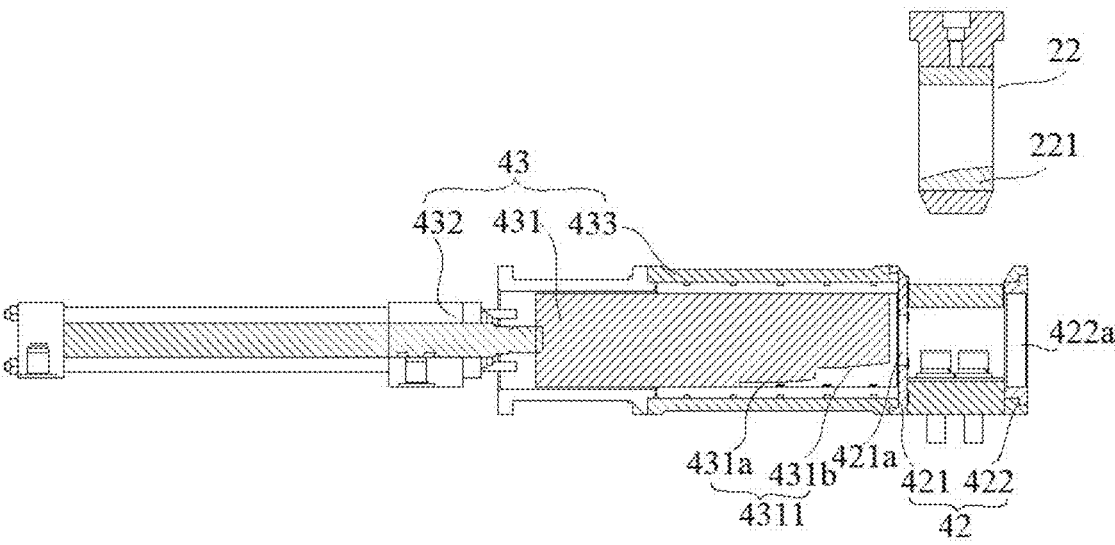
FIG. 9 is a sectional structural view along A-A in FIG. 8, where the locking member of the battery is in a state to be installed.

In some embodiments, as shown in FIGS. 8 and 9, the locking shaft 431 includes an inclined segment 4311, which is inclined towards a direction close to the battery along a protruding direction of the locking shaft 431, and the inclined segment 4311 is adapted for matching with a wedge 221 of the battery.

Specifically, the protruding direction of the locking shaft 431 described herein refers to a direction in which the locking shaft 431 extends through the battery and is supported on the first support seat 421 and the second support seat 422 after protruding. The wedge 221 may be a block formed within the locking member 22 by which the battery matches with the locking shaft 431, and adapted for matching with the inclined segment 4311, and the wedge 221 has an inclined direction opposite to the inclined direction of the inclined segment 4311, so that it can fit with the inclined segment well.

It can be understood that due to the processing accuracy deviation between the locking shaft 431 and the battery, a good fit between the locking shaft 431 and the battery cannot be guaranteed after the locking shaft 431 extends through the battery. By providing the inclined segment 4311 of the locking shaft 431 to match with the wedge 221 of the battery, the specific protruding length and distance of the locking shaft 431 can be set according to actual requirements during the process of the locking shaft 431 extending through the battery along the protruding direction, so as to ensure the good fit between the locking shaft 431 and the battery. As a result, it is beneficial to reduce the requirements on the processing accuracy of the parts of the battery and the locking shaft 431 matching with each other, thereby reducing production costs.

The inclined segment 4311 can be integrally formed and provided with an appropriate inclination angle.

Figure 10:
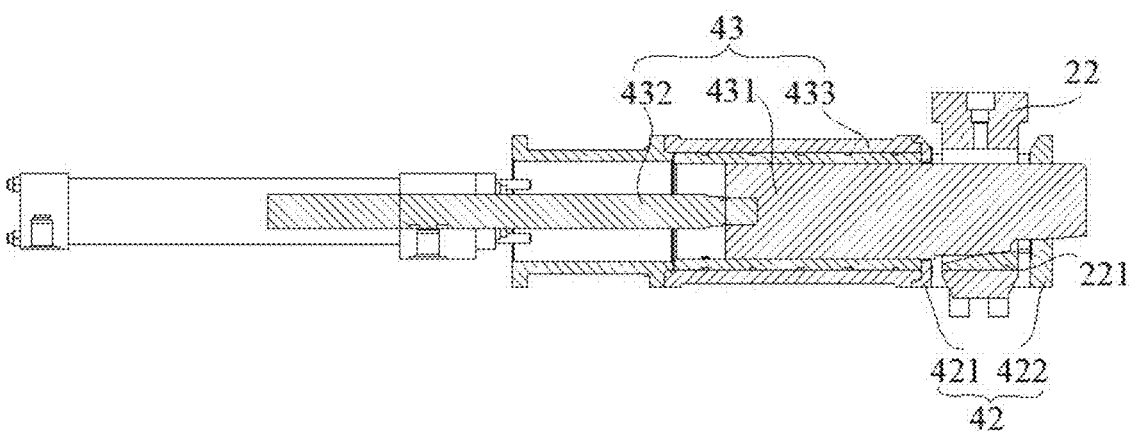
FIG. 10 is a sectional structural view along A-A in FIG. 8, where the locking member of the battery is in an installed state.

In some optional embodiments, continuing to refer to FIGS. 8 to 10, the inclined segment 4311 includes a first sub segment 431*a* and a second sub segment 431*b*, and the first and second sub segments 431*a* and 431*b* are distributed in a stepped manner.

Specifically, corresponding surfaces of the first and second sub segments 431*a* and 431*b* may be parallel to each other or have different inclination angles. By providing the first sub segment 431*a* and the second sub segment 431*b* in the stepped manner, a matching of the second sub segment 431*b* with the wedge 221 can be achieved by moving the locking shaft 431 with a small distance along the protruding direction thereof when the first sub segment 431*a* cannot match with the wedge 221. As such, the installation difficulty of the battery 2 can be reduced effectively.

When it is necessary to limit the battery, the locking shaft 431 can protrude in the protruding direction such that the locking shaft 431 is allowed to extend through the battery, and when the battery needs to be removed from the electric-powered device, the locking shaft 431 needs to be retracted to release the locking on the battery. The protruding movement of the locking shaft 431 can be achieved manually or mechanically, the specific manner is not limited herein, and can be selected according to actual requirements.

In some embodiments, the locking mechanism 43 further includes a driving component 432 connected to the locking shaft 431, and the driving component 432 is adapted to drive the locking shaft 431 to move.

Specifically, the driving component 432 is adapted to drive the locking shaft 431 to protrude in the protruding direction, so as to limit the locking member 22 of the battery. When the battery needs to be removed from the installation seat 4, the driving component can drive the locking shaft 431 to retract so as to unlock the battery from the installation seat 4. By providing the driving component 432 to drive the locking shaft 431 to move, the movement of the locking shaft 431 can be more labor-saving and convenient.

It can be understood that the driving component 432 can be a pneumatic cylinder, a hydraulic cylinder, a motor or other components. Exemplarily, the driving component 432 is a hydraulic cylinder, and the locking shaft 431 is connected to a piston rod; by extending or retracting of the piston rod, the locking shaft 431 can limit or release the battery.

The locking shaft 431 can be exposed to the external environment, or a protective device can be provided to cover the locking shaft 431 so as to protect the locking shaft 431.

In some optional embodiments, the locking mechanism 43 further includes a sleeve 433, which is sleeved on the locking shaft 431 and can protrude out of the sleeve 433.

Specifically, the locking shaft 431 retracts into the sleeve 433 when it does not need to support and limit the battery, and protrudes out of the sleeve 433 when it needs to support the battery. By providing the sleeve 433, the locking shaft 431 can be protected, and the risk of external particles, dust, and the like infiltrating into the extension-retraction joint of the locking shaft 431 and causing the locking shaft 431 to become stuck, is reduced. Moreover, during the movement of the locking shaft 431, the sleeve 433 can provide guiding for the movement of the locking shaft 431, thereby reducing the risk of deviation of the locking shaft 431.

The sleeve 433 can be provided independently of the first support seat 421 and the second support seat 422, or can be connected with the first support seat 421 and the second support seat 422, and the present application does not limit this.

In some optional embodiments, the first support seat 421 is connected to the sleeve 433, and the second support seat 422 is connected to the first support seat 421.

As such, the first support seat 421, the second support seat 422, and the sleeve 433 can be connected together and then disposed on the seat body 41, the integrity of the internal structure of the installation seat 4 can be improved; moreover, by connecting the three components, the movement accuracy of the locking shaft 431 and the fitting accuracy between the locking shaft 431 and the battery can be improved.

According to different manners by which the installation seat 4 supports the battery, the installation seat 4 can include one or more locking mechanisms 43, and in the embodiments where the installation seat 4 includes multiple locking mechanisms 43, the multiple locking mechanisms 43 can be distributed in multiple forms, such as in one row, in two rows, or even more rows, which can be specifically set according to the actual requirements on the bearing capability of the installation seat 4 for the battery.

Figure 11:
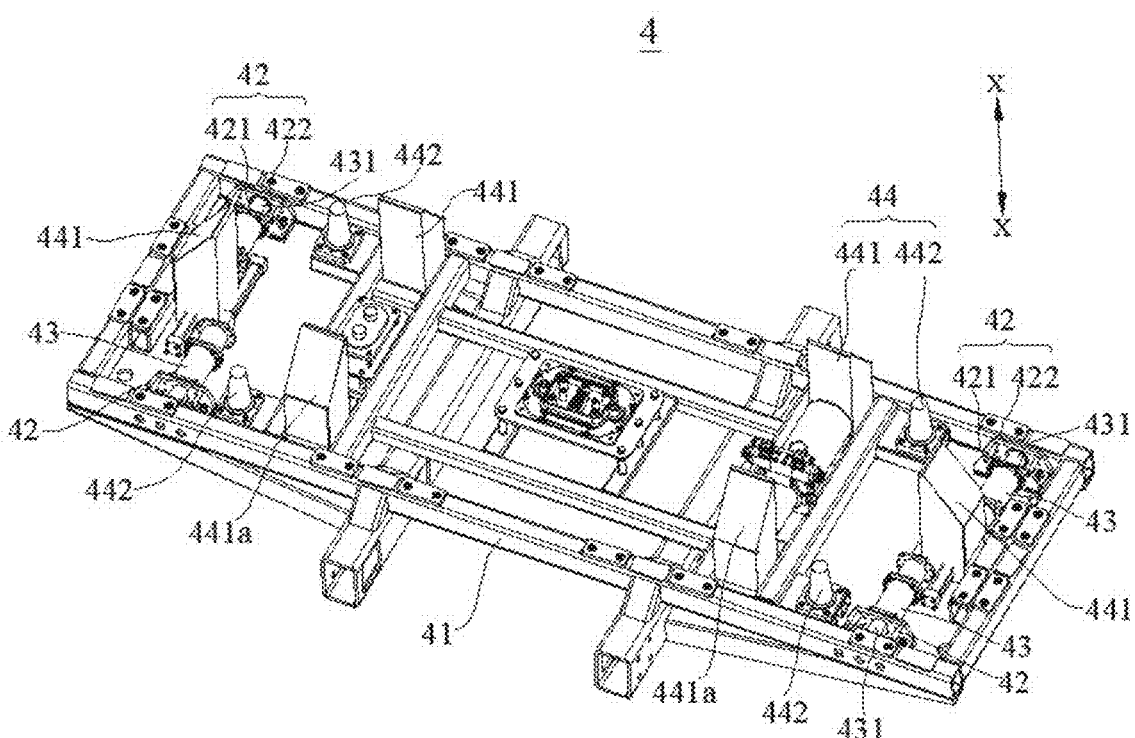
FIG. 11 is a structural schematic diagram of another installation seat provided in the embodiments of the present application.
Figure 12:
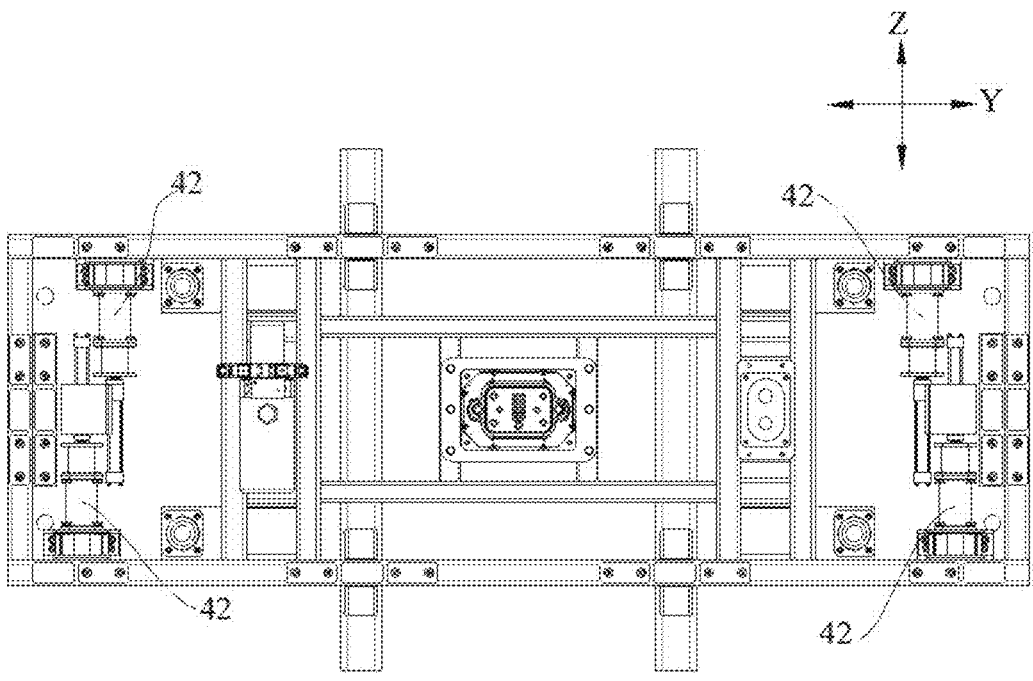
FIG. 12 is a structural schematic diagram of a further installation seat provided in the embodiments of the present application.

In some embodiments, as shown in FIGS. 11 and 12, the installation seat 4 includes a plurality of locking mechanisms 43, which are spaced apart on the seat body 41.

It can be understood that, by providing a plurality of locking mechanisms 43, the loads on the installation seat 4 applied by the battery can be distributed among the plurality of locking mechanisms 43, and thus the loads from the battery borne by one single locking mechanism 43 can be reduced under the same weight of the battery. As such, the bearing capacity of the installation seat 4 can be increased, thereby improving the service life of the installation seat 4.

In some embodiments, the battery is supported along a first direction X by the installation seat 4, the battery includes first surfaces arranged opposite in a second direction Y and second surfaces arranged opposite in a third direction Z. and the first surfaces connects two second surfaces. Any two of the first direction X, second direction Y. and third direction Z are perpendicular to each other.

Specifically, the first direction X can be vertical, and the second direction Y and the third direction Z can be horizontal. The locking shaft 431 can protrude in the second direction Y, the third direction Z, or other directions. When the installation seat 4 includes a plurality of locking mechanisms 43, the plurality of locking mechanisms 43 can be spaced apart along the second direction Y or the third direction Z, or the locking mechanisms 43 can be arranged in pairs, respectively on two sides of the battery in the second direction Y or the third direction Z.

In some optional embodiments, the installation seat 4 includes two locking mechanisms 43, which are spaced apart from each other in the second direction Y. Two locking shafts 431 are arranged with their axial directions in the second direction Y. and the two locking shafts 431 protrude in two opposite directions.

As such, the supporting force of the two locking mechanisms 43 on the battery can be symmetrically arranged relative to the center of gravity of the battery as much as possible, the force balance of the battery on the installation seat 4 can be improved, and the overturning moment experienced by the battery can be reduced.

In some other embodiments, the installation seat 4 includes a plurality of pairs of locking mechanisms 43, the locking mechanisms 43 in each pair are spaced apart in the second direction Y. and the plurality of pairs of locking mechanisms 43 are spaced apart in the third direction Z, the locking shafts 431 are arranged with their axial directions in the second direction, and the locking shafts 431 in each pair of locking mechanisms 43 protrude in opposite directions.

It should be noted that each locking mechanism 43 corresponds to one support assembly 42, and when a plurality of pairs of locking mechanisms 43 are provided, a plurality of pairs of support assemblies 42 need to be correspondingly provided to support the locking shafts 431 of the respective locking mechanisms 43.

It can be understood that when the installation seat 4 includes a plurality of pairs of locking mechanisms 43, the bearing capacity of the installation seat 4 for the battery can be improved, and the force on the locking shaft 431 of each locking mechanism 43 is reduced. By making the locking mechanisms 43 in respective pairs to protrude in opposite directions, it is conductive to improving the force balance of the battery.

In some embodiments, the installation seat 4 further includes a guiding-positioning mechanism 44 disposed on the seat body 41. The guiding-positioning mechanism 44 is adapted to guide a movement of the battery and position the battery.

It can be understood that before the locking shaft 431 extends through the battery, it is necessary to position the battery so as to ensure that the battery is located at a preset position in the installation seat 4 and ensure the position accuracy of the battery installation. Therefore, by providing the guiding-positioning mechanism 44, the battery can be guided in its moving direction during the process of being placed in the installation seat 4, thereby reducing the requirements of repeatedly adjusting the position of the battery after the battery is placed in the installation seat 4. After the battery is placed in place, the guiding-positioning mechanism 44 simply positions the battery, thereby reducing the risk of displacement deviation of the battery after being placed in the installation seat 4. Therefore, by providing the guiding-positioning mechanism 44, the installation accuracy and efficiency of the battery can be effectively improved.

The specific structure of the guiding-positioning mechanism 44 is not limited, as long as it can provide guiding for the movement of the battery and have a certain positioning effect on the battery after the battery is placed in place.

In some optional embodiments, the guiding-positioning mechanism 44 includes a guiding member 441 and a positioning pin 442. The guiding member 441 includes a guiding surface 441a adapted to guide the movement of the battery. The positioning pin 442 is adapted to match with a positioning hole of the battery to position the battery.

Specifically, the guiding surface 441a can be an inclined plane inclining toward the installation seat 4. During a movement towards the installation seat 4, the battery can come into contact with and move along the guiding surface 441a. During the movement of the battery along the guiding surface 441a, the positioning hole of the battery gradually matches with the positioning pin 442, and after the battery moves in place, the positioning pin 442 can position the battery. Therefore, by providing the guiding-positioning mechanism 44 to include the guiding member 441 and the positioning pin 442, the guiding and positioning of the battery during the installation process can be achieved through a simple structure.

There is no limit on the amount of the guiding member 441 and the positioning pin 442. Exemplarily, the guiding members 441 can be disposed at all the positions corresponding to four edges of the battery opposite to the installation seat 4, and two positioning pins 442 can be disposed on a diagonal line of the installation seat 4 opposite to the battery. As such, the guiding to the battery is more precise and the installation efficiency of the battery is further improved.

The electric-powered device provided according to the embodiments of the present application includes a battery and the installation seat 4 provided by any of the above embodiments. A portion of the battery protrudes into a space between the first support seat 421 and the second support seat 422, and the locking shaft 431 extends through the portion of the battery that protrudes into the space between the first support seat 421 and the second support seat 422 and is supported on the first support seat 421 and the second support seat 422 to fix the battery.

It should be noted that in the absence of conflicts, the embodiments and the features in the embodiments in the present application can be combined with each other.

Finally, it should be noted that the above embodiments are only intended to illustrate the technical solutions of the present application, while not to limit it; although the present application has been described in detail with reference to the aforementioned embodiments, ordinary skilled person in the art should understand that they can still modify the technical solutions mentioned in the aforementioned embodiments or equivalently replace some of the technical features, but these modifications or replacements do not make the essence of the corresponding technical solutions deviate from the spirit and scope of the technical solutions in the various embodiments of the present application.

What is claimed is:

1. An installation seat of an electric-powered device, the installation seat being adapted for installing a battery and comprising:
 a seat body;
 a support assembly, disposed on the seat body and comprising a first support seat and a second support seat spaced apart from each other; and
 a locker, disposed on the seat body and comprising a locking shaft, wherein the locking shaft is adapted to extend through a portion of the battery including an enclosure having an opening, the portion protruding into a space between the first support seat and the second support seat, and the locking shaft is supported on the first support seat and the second support seat to fix the battery.

2. The installation seat according to claim 1, wherein the first support seat comprises a first support hole through which the locking shaft extends; and/or,
 the second support seat comprises a second support hole through which the locking shaft extends.

3. The installation seat according to claim 1, wherein the locking shaft comprises an inclined segment inclining toward a direction close to the battery along a protruding direction of the locking shaft;
 the inclined segment is adapted to match with a wedge on an interior surface of the enclosure of the portion of the battery.

4. The installation seat according to claim 3, wherein the inclined segment comprises a first sub segment and a second sub segment, and the first and second sub segments are distributed in a stepped manner.

5. The installation seat according to claim 1, wherein the locker further comprises a driver connected to the locking shaft, and the driver is adapted to drive the locking shaft to move.

6. The installation seat according to claim 1, wherein the locker further comprises a sleeve, the sleeve is sleeved on the locking shaft, and the locking shaft is able to protrude out of the sleeve.

7. The installation seat according to claim 6, wherein the first support seat is connected to the sleeve, and the second support seat is connected to the first support seat.

8. The installation seat according to claim 1, wherein the installation seat comprises a plurality of lockers, and the plurality of lockers are spaced apart on the seat body.

9. The installation seat according to claim 8, wherein the battery is supported on the installation seat along a first direction, the battery comprises first surfaces arranged opposite in a second direction and second surfaces arranged opposite in a third direction, the first surfaces are connected to two second surfaces, and any two of the first direction, the second direction, and the third direction are perpendicular to each other; and
 the installation seat comprises two lockers, the two lockers are spaced apart in the second direction, two locking shafts are arranged with their axial directions in the second direction, and the two locking shafts protrude in opposite directions; or,
 the installation seat comprises a plurality of pairs of lockers, the lockers in each pair are spaced apart in the second direction, and the plurality of pairs of lockers are spaced apart in the third direction, wherein the locking shafts are arranged with their axial directions in the second direction, and the locking shafts in each pair of lockers protrude in opposite directions.

10. The installation seat according to claim 1, wherein the installation seat further comprises a guiding-positioning structure disposed on the seat body, and the guiding-positioning structure is adapted to guide the battery to move and position the battery.

11. The installation seat according to claim 10, wherein the guiding-positioning structure comprises:
 a guider, comprising a guiding surface adapted to guide a movement of the battery; and
 a positioning pin, adapted to match with a positioning hole of the battery to position the battery.

12. An electric-powered device, comprising:
 an installation seat of the electric-powered device, the installation seat being adapted for installing a battery and comprising:
 a seat body;
 a support assembly, disposed on the seat body and comprising a first support seat and a second support seat spaced apart from each other; and
 a locker, disposed on the seat body and comprising a locking shaft, wherein the locking shaft is adapted to extend through a portion of the battery including an enclosure having an opening protruding into a space between the first support seat and the second support seat and be supported on the first support seat and the second support seat to fix the battery; and
 the battery, wherein the portion of the battery protrudes into the space between the first and second support seats, the locking shaft extends through the portion of the battery that protrudes into the space between the first and second support seats and is supported on the first and second support seats so as to fix the battery.

13. The installation seat according to claim 3, wherein:
 the locking shaft extends through the opening of the portion, and
 the locking shaft extends past the second support seat.

14. An installation seat of an electric-powered device, the installation seat being adapted for installing a battery and comprising:

a seat body;

a support assembly, disposed on the seat body and comprising a first support seat and a second support seat spaced apart from each other; and a locker, disposed on the seat body and comprising a locking shaft, wherein the locking shaft is adapted to extend through a portion of the battery including an enclosure having an opening, the portion protruding into a space between the first support seat and the second support seat, and the locking shaft is supported on the first support seat and the second support seat to fix the battery, wherein the installation seat further comprises:

a guider having a lower surface in a plane of the installation seat, a guiding surface inclining toward a center of the installation seat, a first upper end, and a second upper end, wherein the guiding surface guides a movement of the battery, and the first upper end being closer to the center of the installation seat than the second upper end, the first upper end being farther from the lower surface than the second upper end such that the guiding surface extends between the first upper end and the second upper end while inclining toward the center of the installation seat.

15. The installation seat according to claim 14, wherein the installation seat further comprises:

at least two guiders each having the guiding surface inclining toward the center of the installation seat.

16. The installation seat according to claim 14, wherein the installation seat further comprises:

at least four guiders each having the guiding surface inclining toward the center of the installation seat.

17. The installation seat according to claim 14, wherein the installation seat further comprises:

at least six guiders each having the guiding surface inclining toward the center of the installation seat.

18. The installation seat according to claim 14, wherein the installation seat further comprises:

a positioning pin that protrudes from the plane of the installation seat, wherein the positioning pin matches with a positioning hole of the battery to position the battery, and the positioning pin being adjacent to the guider along a peripheral edge of the installation seat.

19. The installation seat according to claim 18, wherein the installation seat further comprises:

at least two positioning pins disposed on a diagonal line in the plane of the installation seat.

20. The installation seat according to claim 19, wherein the installation seat further comprises:

at least two pairs of the at least two positioning pins, a first pair of the at least two pairs of the at least two positioning pins disposed on the diagonal line in the plane of the installation seat, and a second pair of the at least two pairs of the at least two positioning pins disposed on another diagonal line in the plane of the installation seat.

\* \* \* \* \*